US00RE45820E

(19) United States
(12) Reissued Patent
Jiang et al.

(10) Patent Number: US RE45,820 E
(45) Date of Reissued Patent: Dec. 22, 2015

(54) TUB FOR BATHING

(71) Applicant: Kohler Co., Kohler, WI (US)

(72) Inventors: Mimi Jiang, Shanghai (CN); Timothy E. Hoh, Lions Bay (CA)

(73) Assignee: KOHLER CO., Kohler, WI (US)

(21) Appl. No.: 29/454,755

(22) Filed: May 14, 2013

Related U.S. Patent Documents

Reissue of:
(64) Patent No.: Des. 638,107
Issued: May 17, 2011
Appl. No.: 29/368,280
Filed: Aug. 20, 2010

(51) LOC (10) Cl. ..... 23-02
(52) U.S. Cl.
USPC ..... D23/277
(58) Field of Classification Search
USPC ..... D23/277, 280.1, 303–304; D24/204; 4/538, 573.1, 575.1
CPC ..... A47K 3/022
See application file for complete search history.

(56) References Cited

U.S. PATENT DOCUMENTS

| | | | | |
|---|---|---|---|---|
| 3,863,275 | A | 2/1975 | Brendgord et al. | |
| D274,455 | S | 6/1984 | Cuttriss | |
| D323,378 | S | 1/1992 | Delepine | |
| D446,574 | S * | 8/2001 | Thomas et al. | D23/280.1 |
| 6,360,380 | B1 | 3/2002 | Swart et al. | |
| D462,113 | S | 8/2002 | Marshall et al. | |
| 6,637,051 | B1 * | 10/2003 | Swart | 4/688 |
| 6,993,415 | B2 * | 1/2006 | Bauer et al. | 700/282 |
| D524,924 | S * | 7/2006 | Lanius | D23/277 |
| D524,926 | S * | 7/2006 | Lebrun et al. | D23/280.1 |
| D527,083 | S * | 8/2006 | Lebrun et al. | D23/280.1 |
| D539,393 | S * | 3/2007 | Hashida | D23/277 |
| D558,860 | S * | 1/2008 | Breymaier et al. | D23/277 |
| D567,914 | S * | 4/2008 | Ishiyama et al. | D23/277 |
| D576,715 | S * | 9/2008 | Breymaier et al. | D23/277 |

(Continued)

OTHER PUBLICATIONS

"Askew Freestanding Bath K-1801 by Kohler." Product Catalog and Specification., Dec. 22, 2011 [online], [retrieved on Jun. 6, 2014]. Retrieved from the Internet <URL: http://www.us.kohler.com/webassets/kpna/catalog/pdf/en/1145129_4.pdf>.*
Kohler Co. "Underscore" Bubble Massage Bath—6'; Kohler Co. online catalog; copyright 2010 Kohler Co.; 2 pages.
Neptune "Bora"; HomePortfolio online catalog; copyright 1997-2010 HomePortfolio Inc.; 1 page.
Signature Aire Dana Acrylic Round Soaking Air Bath Tub; SignatureHardware.com online catalog; copyright 1999-2009; SignatureHardware.com or its affiliates; 1 page.
Kohler Co. "Inscribe Wading Pool Lavatory":, Model No. 2388; Kohler online catalog; copyright 2010 Kohler Co.; 2 pages.
Kohler Co. "Yin-Yang Wading Pool Lavatory"; Model Nos. K-2353 and K-2354; Kohler Co. online catalog; copyright 2010 Kohler Co.; 3 pages.

*Primary Examiner* — Philip S Hyder
*Assistant Examiner* — Darlington Ly
(74) *Attorney, Agent, or Firm* — Foley & Lardner LLP

(57) CLAIM

The ornamental design for a tub for bathing, as shown and described.

DESCRIPTION

FIG. 1 is a right, top, front [perspective] *isometric* view of a tub for bathing embodying our new design;
FIG. 2 is a top plan view thereof;
FIG. 3 is a front elevational view thereof;
FIG. 4 is a rear elevational view thereof;
FIG. 5 is a right side elevational view thereof;
FIG. 6 is a left side elevational view thereof;
FIG. 7 is a bottom plan view thereof; and,
FIG. 8 is sectional view taken along line 8-8 of FIG. 2.
The broken line representations in the figures are for the purpose of illustration only, and form no part of the claimed design.
In a preferred embodiment, the nature of this product is as a plumbing fixture in the form of a bathing tub primary useful for washing the human body.

1 Claim, 8 Drawing Sheets

Figure 1:
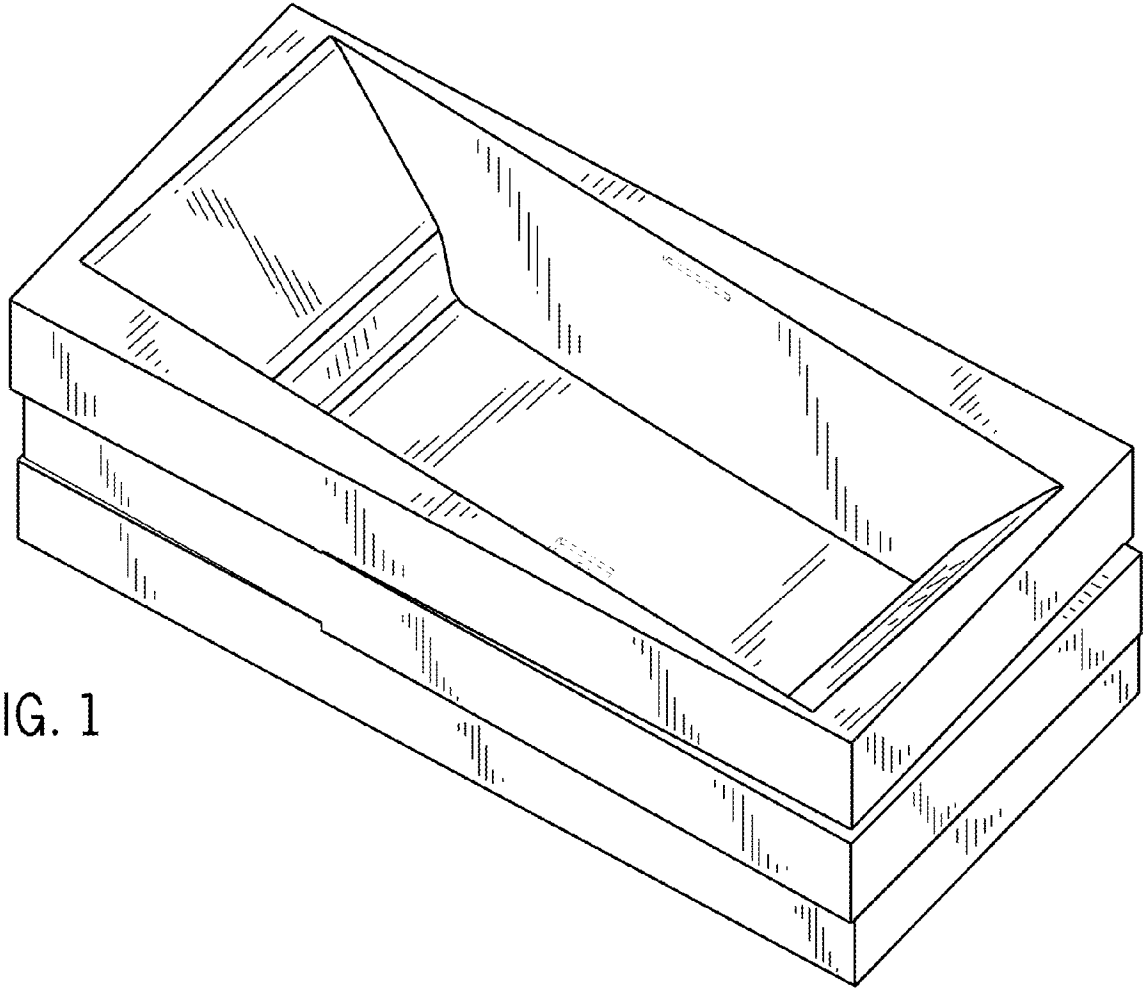
Figure 2:
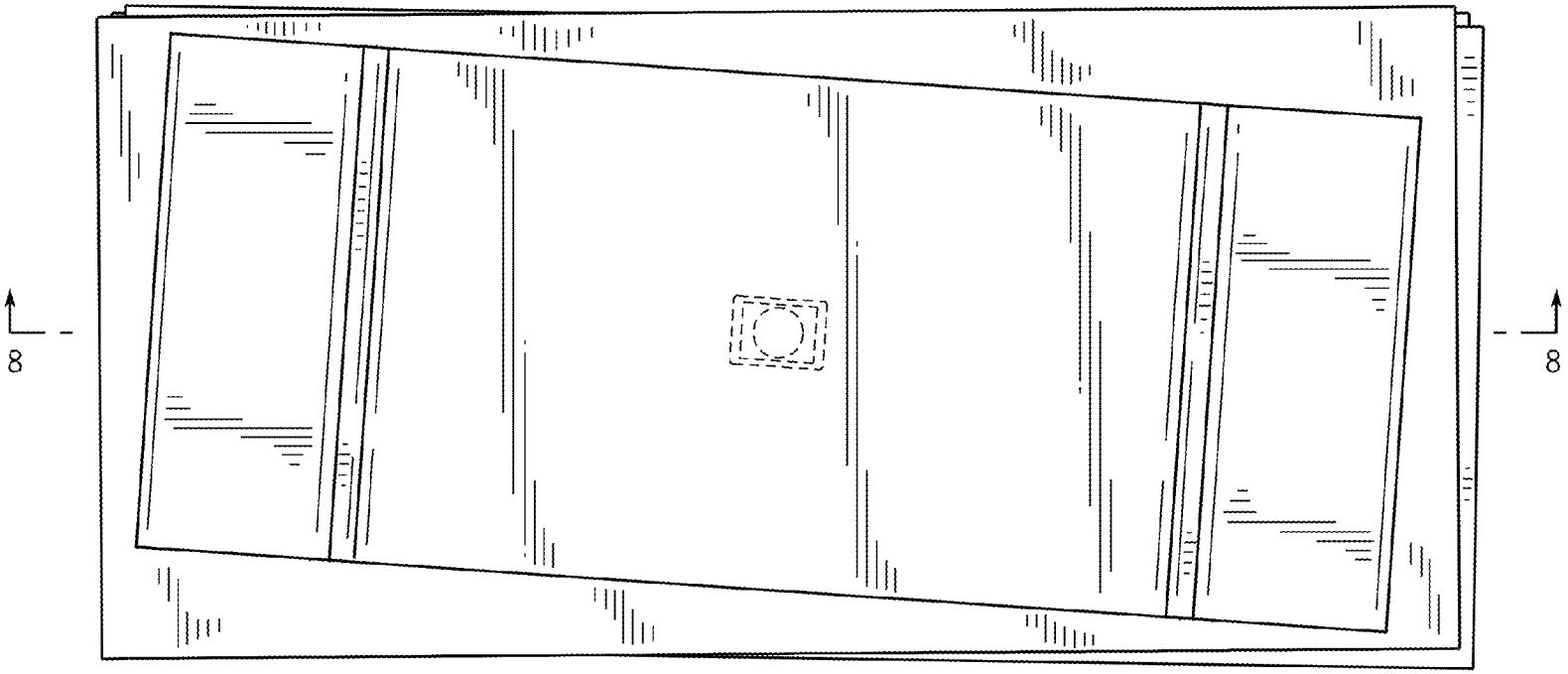
Figure 3:
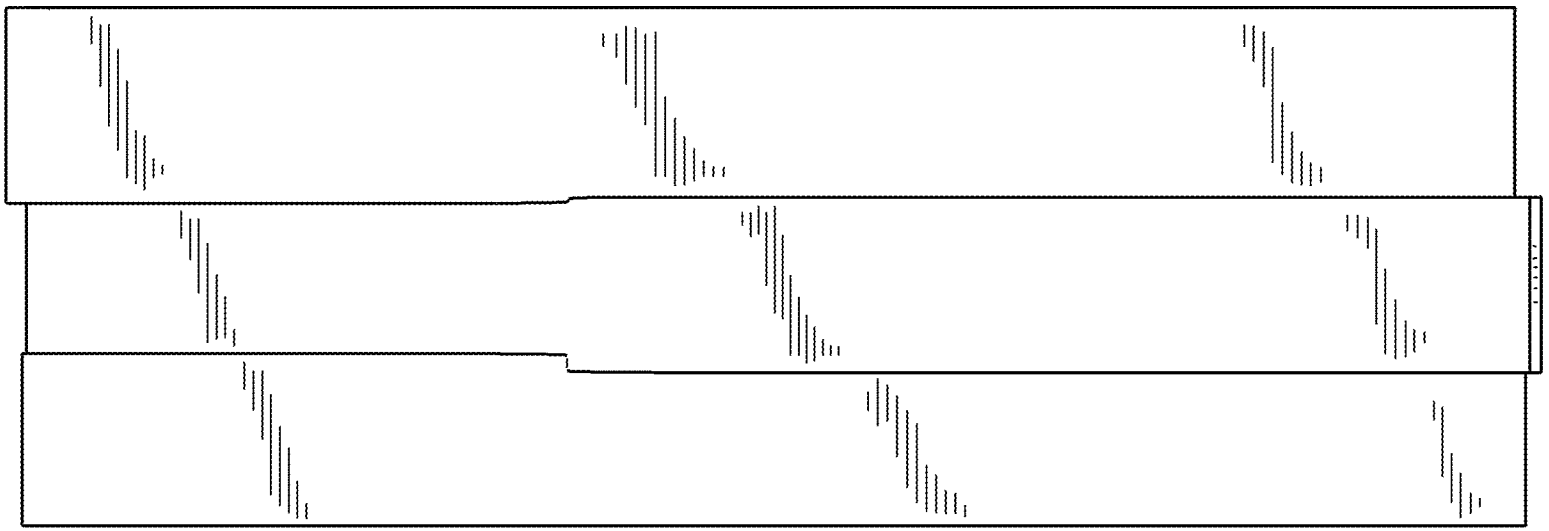
Figure 4:
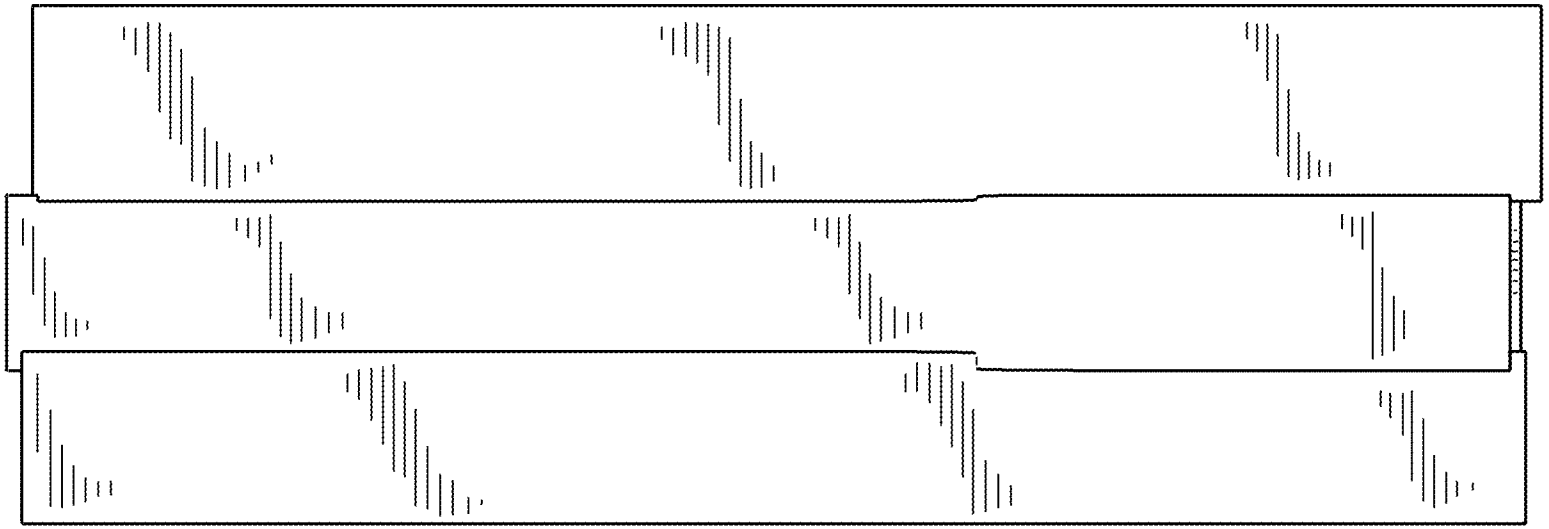
Figure 5:
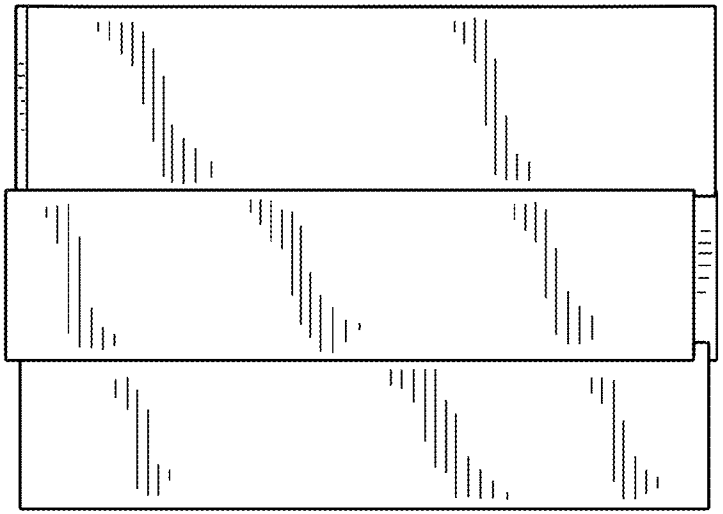
Figure 6:
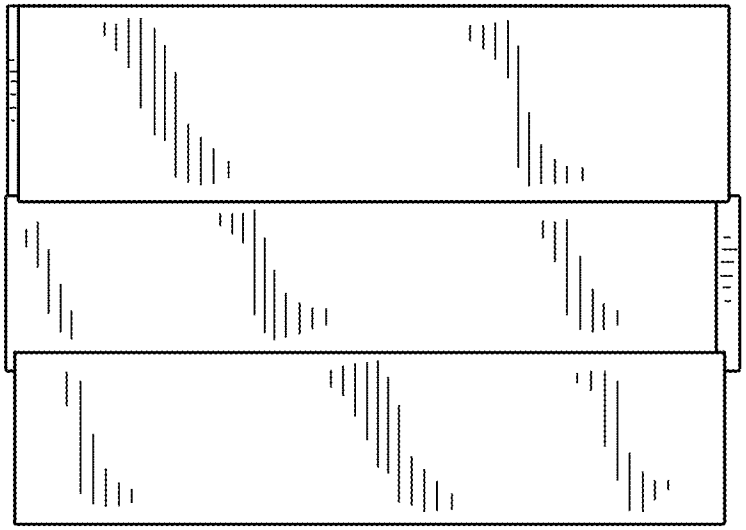
Figure 7:
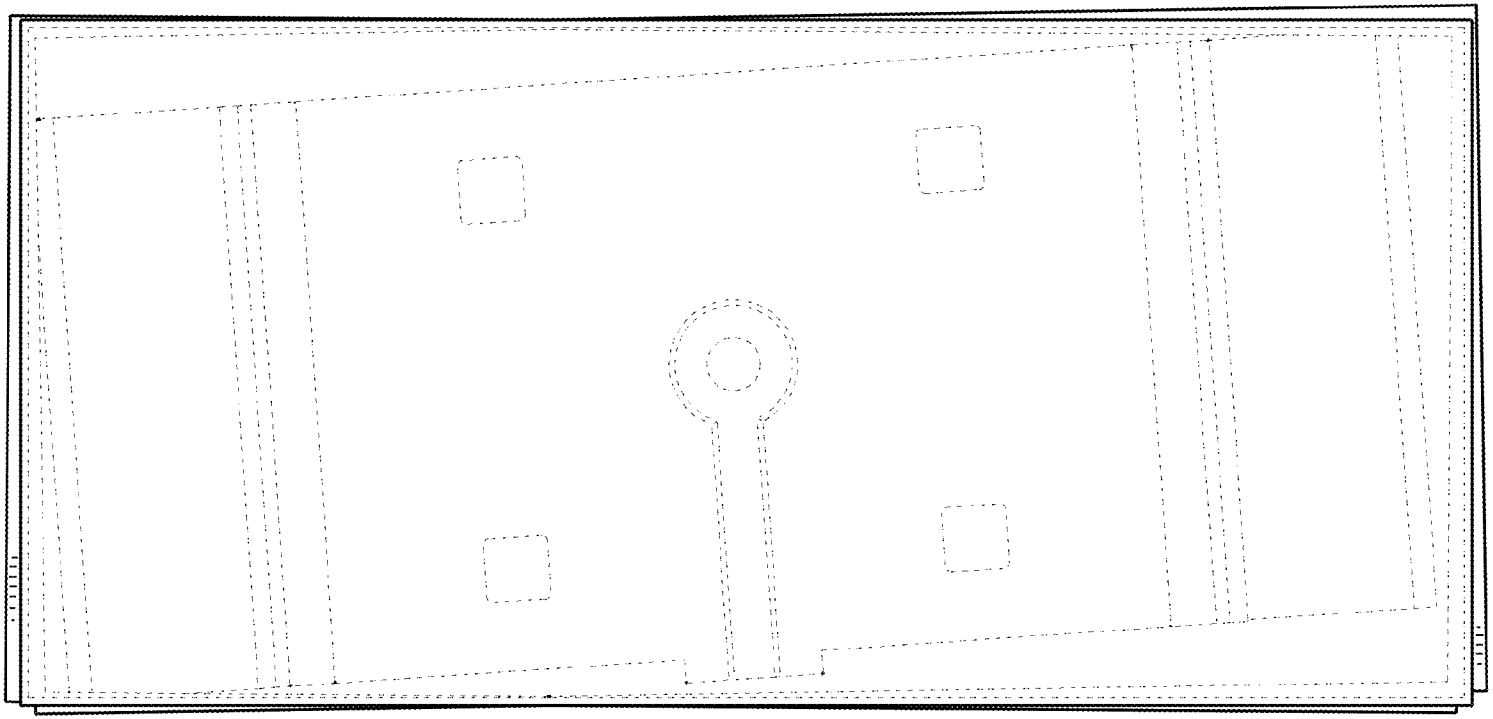
Figure 8:
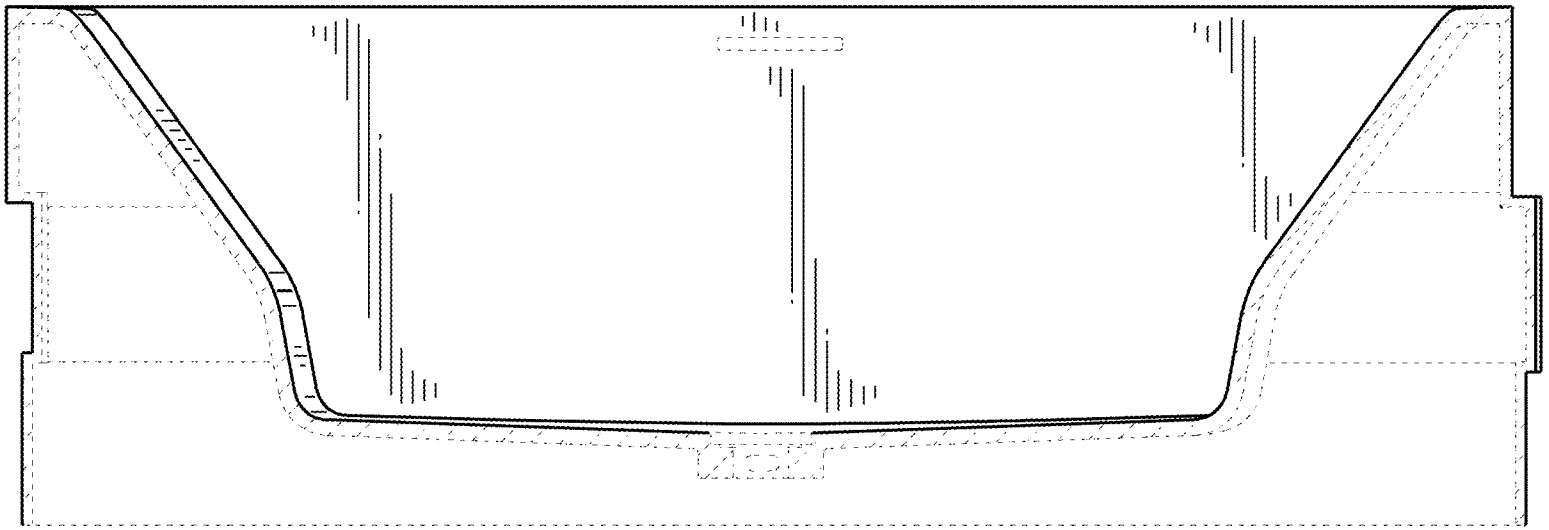

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D577,108 | S | * | 9/2008 | Piatt | D23/277 |
| D594,940 | S | * | 6/2009 | Bates | D23/277 |
| D595,817 | S | * | 7/2009 | Stanchak et al. | D23/277 |
| D610,656 | S | | 2/2010 | Terrell | |
| D633,603 | S | * | 3/2011 | Su | D23/280.1 |
| D642,663 | S | * | 8/2011 | Dosne | D23/304 |
| 7,992,234 | B2 | * | 8/2011 | Bates et al. | 4/579 |
| D701,595 | S | * | 3/2014 | Blum | D23/304 |

* cited by examiner